United States Patent
Lee et al.

(10) Patent No.: US 10,015,428 B2
(45) Date of Patent: Jul. 3, 2018

(54) IMAGE SENSOR HAVING WIDE DYNAMIC RANGE, PIXEL CIRCUIT OF THE IMAGE SENSOR, AND OPERATING METHOD OF THE IMAGE SENSOR

(71) Applicant: Samsung Electronics Co., Ltd., Suwon-si, Gyeonggi-do (KR)

(72) Inventors: Ji-won Lee, Daegu (KR); Moo-sup Lim, Yongin-si (KR); Seung-sik Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 49 days.

(21) Appl. No.: 15/190,297

(22) Filed: Jun. 23, 2016

(65) Prior Publication Data
US 2017/0013217 A1    Jan. 12, 2017

(30) Foreign Application Priority Data
Jul. 7, 2015 (KR) .................. 10-2015-0096786

(51) Int. Cl.
| | |
|---|---|
| H04N 5/335 | (2011.01) |
| H04N 3/14 | (2006.01) |
| H04N 5/3745 | (2011.01) |
| H04N 5/355 | (2011.01) |
| H04N 5/232 | (2006.01) |

(52) U.S. Cl.
CPC ..... *H04N 5/37457* (2013.01); *H04N 5/23245* (2013.01); *H04N 5/35563* (2013.01)

(58) Field of Classification Search
None
See application file for complete search history.

(56) References Cited

U.S. PATENT DOCUMENTS

| | | | |
|---|---|---|---|
| 7,238,926 B2 | 7/2007 | Guidash et al. |
| 7,825,966 B2 | 11/2010 | Manabe et al. |
| 8,059,174 B2 | 11/2011 | Mann et al. |
| 8,199,232 B2 | 6/2012 | Watanabe |
| 8,253,090 B2 | 8/2012 | Barbier et al. |
| 8,253,810 B2 | 8/2012 | Myers et al. |
| 8,502,895 B2 | 8/2013 | Yosefin |

(Continued)

FOREIGN PATENT DOCUMENTS

| | | |
|---|---|---|
| KR | 10-0865111 B1 | 10/2008 |
| KR | 10-2011-0037187 A | 4/2011 |

*Primary Examiner* — Stephen Coleman
(74) *Attorney, Agent, or Firm* — Harness, Dickey & Pierce, P.L.C.

(57) ABSTRACT

A pixel circuit includes a first photocharge accumulator including at least two photodiodes exposed to light for a long period of time, and a second photocharge accumulator including at least one photodiode exposed to light for a short period of time. The pixel circuit includes a first transfer controller that transfers photocharges accumulated in the first photocharge accumulator to a floating diffusion area, and a second transfer controller that transfers photocharges accumulated in the second photocharge accumulator to the floating diffusion area. The pixel circuit includes a driving transistor to generate a pixel signal according to the photocharges transferred to the floating diffusion area. A number of photodiodes of the first photocharge accumulator is greater than a number of photodiodes of the second photocharge accumulator.

19 Claims, 22 Drawing Sheets

(56) References Cited

U.S. PATENT DOCUMENTS

| | | |
|---|---|---|
| 8,786,731 B2 | 7/2014 | Kasai |
| 8,791,401 B2 | 7/2014 | Barbier et al. |
| 2008/0030605 A1* | 2/2008 | Tsukimura ............. H04N 3/155 |
| | | 348/302 |
| 2010/0177221 A1 | 7/2010 | Lee |
| 2011/0141325 A1 | 6/2011 | Nakajima |
| 2013/0256510 A1 | 10/2013 | Lyu |

* cited by examiner

FIG. 5B

4x4 sub-pixel

IMAGE SENSOR HAVING WIDE DYNAMIC RANGE, PIXEL CIRCUIT OF THE IMAGE SENSOR, AND OPERATING METHOD OF THE IMAGE SENSOR

CROSS-REFERENCE TO RELATED APPLICATION

This application claims priority under 35 U.S.C. § 119 to Korean Patent Application No. 10-2015-0096786, filed on Jul. 7, 2015, in the Korean Intellectual Property Office, the disclosure of which is incorporated herein in its entirety by reference.

BACKGROUND

Inventive concepts relate to an image sensor, and more particularly, to an image sensor having a wide dynamic range, a pixel circuit of the image sensor, and/or a method of operating the image sensor.

Image sensors that photograph an image and convert the image into an electrical signal are used not only in electronic devices for general consumers, such as digital cameras, cameras for cellular phones, and portable camcorders, but also in automobiles, security devices, and cameras mounted in robots. The image sensors include a pixel array, and each pixel included in the pixel array may include a light detecting device. The light detecting device may generate an electrical signal according to an intensity of absorbed light.

Sizes of pixels of the image sensors have been gradually decreased in order to increase the resolution of the image sensors, and thus, there is a desire to maintain image quality despite the reduction of the sizes of pixels. Regarding the image quality of the image sensors, a dynamic range thereof may become a problem. When an image sensor with a wide dynamic range (WDR) is provided, a bright area and a dark area of an image may be represented together. However, it is desired to reduce image deterioration generated by the wide dynamic range.

SUMMARY

The inventive concepts provide an image sensor that has a wide dynamic range and that may be easily realized, a pixel circuit of the image sensor, and/or a method of operating the image sensor.

According to inventive concepts, there is provided a pixel circuit of an image sensor, the pixel circuit including a first photocharge accumulation unit including at least one photodiode configured to be exposed to light for a long period of time, a second photocharge accumulation unit including at least one photodiode configured to be exposed to light for a short period of time, a first transfer control unit configured to transfer photocharges accumulated in the first photocharge accumulation unit to a floating diffusion area, a second transfer control unit configured to transfer photocharges accumulated in the second photocharge accumulation unit to the floating diffusion area, and a driving transistor configured to generate a pixel signal according to the photocharges transferred to the floating diffusion area, wherein a number of photodiodes of the first photocharge accumulation unit is greater than a number of photodiodes of the second photocharge accumulation unit.

According to inventive concepts, there is provided a pixel circuit of an image sensor, the pixel circuit including a photocharge accumulation unit including m first photodiodes and n second photodiodes (m and n are integers, wherein m is greater than n), a floating diffusion area to which photocharges accumulated in the photocharge accumulation unit are transferred, and a driving transistor configured to generate a pixel signal according to the photocharges transferred to the floating diffusion area, wherein at least a portion of a time period in which the m first photodiodes accumulate photocharges overlaps a time period in which the n second photodiodes accumulate photocharges.

According inventive concepts, there is provided an image sensor including a pixel array including a plurality of pixels, each of the pixels including a plurality of sub-pixels, each of the sub-pixels including a photodiode, and a read circuit configured to generate pixel data from a pixel signal of the pixel array, wherein the plurality of sub-pixels includes m first sub-pixels, each of the first sub-pixels including a first photodiode, and n second sub-pixels, each of the n second sub-pixels including a second photodiode (m and n are integers, wherein m is greater than n), and the m first sub-pixels are exposed to light for a longer period of time than the n second sub-pixels.

According to inventive concepts, there is provided a method of operating an image sensor including a plurality of pixels, each of the pixels including a plurality of first photodiodes and at least one second photodiode, the method including exposing the plurality of first photodiodes to light for a first time period, exposing the at least one second photodiode to light for a second time period, generating a first pixel signal corresponding to photocharges accumulated in the plurality of first photodiodes, generating a second pixel signal corresponding to photocharges accumulated in the at least one second photodiode, and generating image data from the first pixel signal and the second pixel signal, wherein in each of the pixels, a number of first photodiodes is greater than a number of second photodiodes.

According to inventive concepts, an image sensor includes a pixel circuit including at least one first light sensor configured to collect first photocharges during a first exposure time period. The pixel circuit includes at least one second light sensor configured to collect second photocharges during a second exposure time period. The image sensor includes a controller configured to generate a first control signal and a second control signal. The first control signal controls a first exposure time period during which the at least one first light sensor collects the first photocharges, and the second control signal controls a second exposure time period during which the at least one second light sensor collects the second photocharges.

BRIEF DESCRIPTION OF THE DRAWINGS

Example embodiments of the inventive concepts will be more clearly understood from the following detailed description taken in conjunction with the accompanying drawings in which:

FIGS. 5A and 5B are views of other examples of the unit pixel group of FIG. 3;

DETAILED DESCRIPTION OF EXAMPLE EMBODIMENTS

Figure 1:
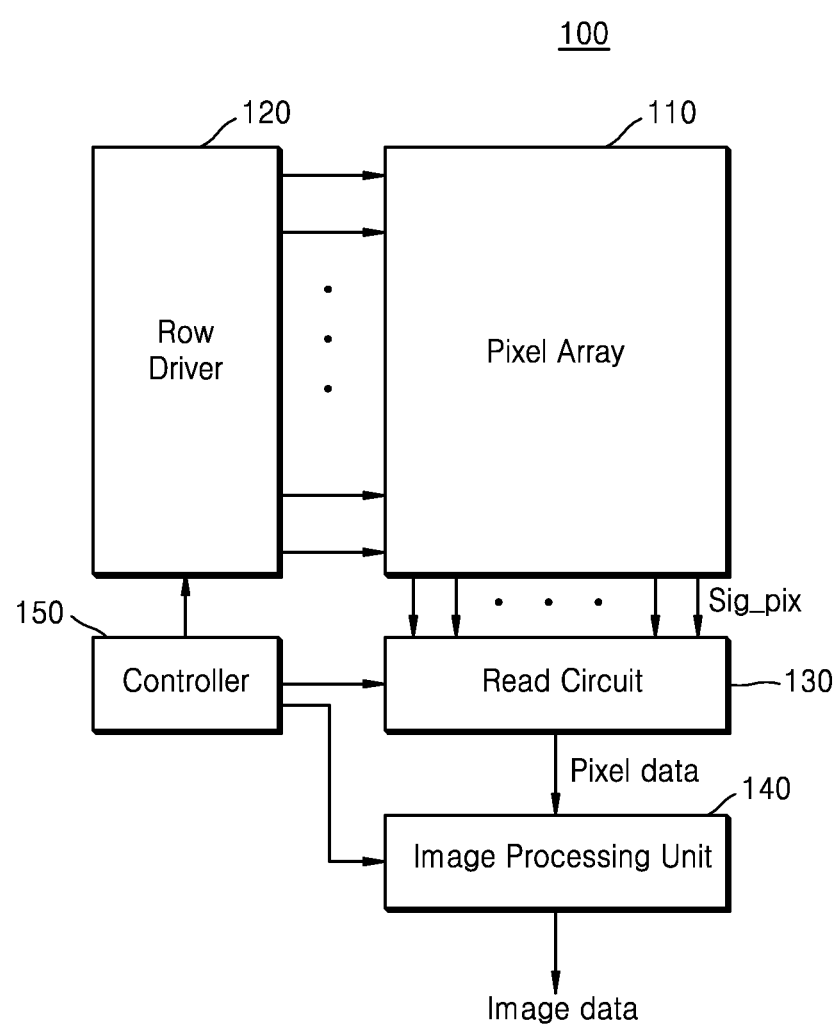
FIG. 1 is a block diagram of an image sensor according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

FIG. 1 is a block diagram of an image sensor 100 according to at least one example embodiment. As illustrated in FIG. 1, the image sensor 100 may include a pixel array 110, a row driver 120, a read circuit 130, an image processing unit (or image processor) 140, and a controller 150. The image sensor 100 may be a complementary metal oxide semiconductor (CMOS) image sensor. The controller 150 may be implemented as a special purpose processor executing instructions stored on a memory and/or by hardware, such as an application specific integrated circuit (ASIC).

The pixel array 110 may include a plurality of pixels arranged in rows and columns. Each of the plurality of pixels may function as a photoelectric conversion device which converts light into an electrical signal. To this end, each of the plurality of pixels may include a light detecting device (or light sensor) capable of accumulating photocharges of a photodiode, a photogate, a phototransistor, etc. Hereinafter, it is assumed that each of the pixels of the pixel array 110 is a light detecting device that includes a photodiode, but example embodiments are not limited thereto.

The row driver 120 may be connected to the pixels through row lines, and the read circuit 130 may be connected to the pixels through column lines. The row driver 120 may drive the row lines under a control of the controller 150. For example, the row driver 120 may provide various signals for resetting the photodiode included in each pixel or for outputting a pixel signal according to the photocharges accumulated in the photodiode. Also, the read circuit 130 may generate pixel data by performing a sampling operation with respect to a pixel signal Sig_pix provided through the column lines. The read circuit 130 may include an analog to digital converter (not shown), and may convert the pixel signal Sig_pix from the pixel array 110, which has an analog value, into the pixel data having a digital value.

For example, the read circuit 130 may perform a correlated double sampling operation with respect to the pixel signal Sig_pix that is output from each of the column lines of the pixel array 110, by applying a correlated double sampling (CDS) method. Also, for example, the read circuit 130 may be designed by using various methods, such as an analog CDS method, a digital CDS method, or a dual CDS method.

Meanwhile, the image processing unit 140 may receive the pixel data from the read circuit 130 and process the received pixel data to output image data. A frame image may be detected by the pixels included in the pixel array 110, and the image data that is output by the image processing unit 140 may correspond to one frame. Also, various types of processing operations may be performed by the image processing unit 140. For example, operations, such as color interpolation, color correction, auto white balance, gamma correction, color saturation correction, format correction, bad pixel correction, hue correction, etc. may be performed by the image processing unit 140.

According to at least one example embodiment, each of the pixels included in the pixel array 110 may include a plurality of photodiodes. Also, for example, the plurality of photodiodes of each of the pixels may be formed to have the same size.

Also, in order to increase a dynamic range of the image sensor 100, the pixels included in the pixel array 110 may be exposed to light for a long period of time and a short period of time. For example, some of the plurality of photodiodes included in each pixel may be exposed to light for a relatively long period of time, and others may be exposed to light for a relatively short period of time. The dynamic range is a brightness range of an image which the image sensor 100 may obtain without a loss of brightness, and as the dynamic range is increased, the image sensor 100 may sense an image of more various ranges of brightness.

The light exposure for a long period of time and the light exposure for a short period of time with respect to the plurality of photodiodes included in each pixel may be performed in various manners. For example, the light exposure may be controlled such that after some of the photodiodes accumulate photocharges for a relatively long period of time, others accumulate photocharges for a relatively short period of time. Alternatively, in any one pixel, a time period in which the photodiodes exposed to light for a long period of time accumulate photocharges may be partially overlapped with a time period in which the photodiodes exposed to light for a short period of time accumulate photocharges. According to the control discussed above, pixel data from the photodiodes which are exposed to light for a long period of time and pixel data from the photodiodes which are exposed to light for a short period of time may be obtained, as information for realizing one frame image.

According to the example described above, a time difference between a light-exposure timing of the photodiodes exposed to light for a long period of time and a light-exposure timing of the photodiodes exposed to light for a short period of time may be reduced, such that deterioration in the image quality due to ghost effects, etc. may be decreased. Also, since the sizes of the plurality of photodiodes included in each pixel may be the same, a manufacturing process of a lens corresponding to the pixel may be simplified, and a possibility of a shading occurrence due to a difference between sizes of the lenses may be reduced.

Figure 2:
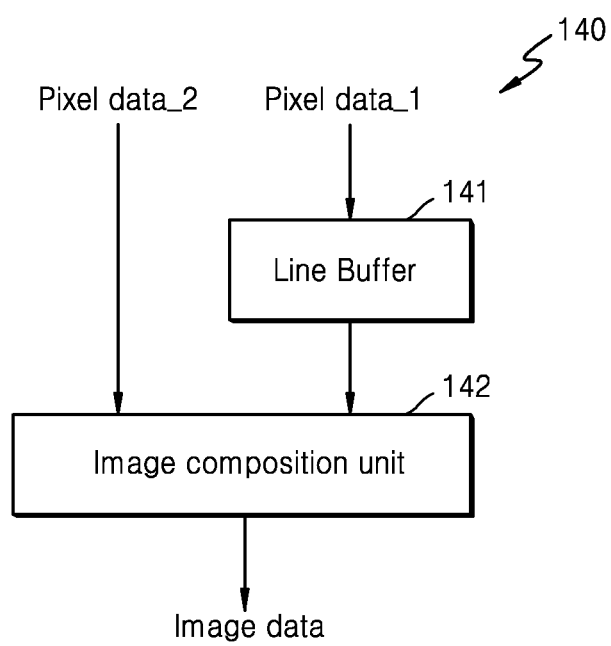
FIG. 2 is a block diagram of an image processing unit of FIG. 1 according to at least one example embodiment.

FIG. 2 is a block diagram of an example embodiment of the image processing unit 140 of FIG. 1. As illustrated in FIG. 2, the image processing unit 140 may include a line buffer 141 and an image composition (or synthesis) unit (or image synthesizer) 142.

Referring to FIGS. 1 and 2, the read circuit 130 may perform sampling with respect to the pixel signal Sig_pix from the pixel array 110, and may generate the pixel data with respect to each pixel, as a digital signal. Also, as described above, with respect to each pixel, first pixel data Pixel data_1 according to the light exposure for a long period of time and second pixel data Pixel data_2 according to the light exposure for a short period of time may be generated.

Referring to a row unit of the pixel array 110, the first pixel data Pixel data_1 may be generated by a light exposure for a long period of time with respect to a plurality of pixels arranged in the row, and the first pixel data Pixel data_1 may be stored in the line buffer 141 of the image processing unit 140. Also, the second pixel data Pixel data_2 may be generated by a light exposure for a short period of time with respect to the plurality of pixels arranged in the row, and the second pixel data Pixel data_2 may be provided to the image synthesis unit 142. The image synthesis unit 142 may output image data corresponding to a frame image, based on a synthesis operation using the second pixel data Pixel data_2, and the first pixel data Pixel data_1 stored in the line buffer 141.

The image synthesis operation may be performed in various manners. For example, an area which receives light of a relatively low luminescence may be realized by the first pixel data Pixel data_1 having high sensitivity and an area which receives light of a relatively high luminescence may be realized by the second pixel data Pixel data_2 having low sensitivity, so as to increase the dynamic range.

The line buffer 141 may have various sizes. For example, the line buffer 141 may include buffers of a size corresponding to one or more rows of the pixel array 110. For example, according to at least one example embodiment, by reducing a time difference between occurrence timings of the first pixel data Pixel data_1 and the second pixel data Pixel data_2, the number of buffers included in the line buffer 141 may be decreased.

The operation of the image processing unit 140 illustrated in FIG. 2 is only an example, and example embodiments are not limited thereto. For example, when the second pixel data Pixel data_2 is generated first by exposing a plurality of pixels arranged in any one row for a short period of time, the second pixel data Pixel data_2 may be stored in the line buffer 141. Then, an image synthesis operation with respect to the first pixel data Pixel data_1, which is sequentially received, and the second pixel data Pixel data_2, which is stored in the line buffer 141, may be performed.

Figure 3A:
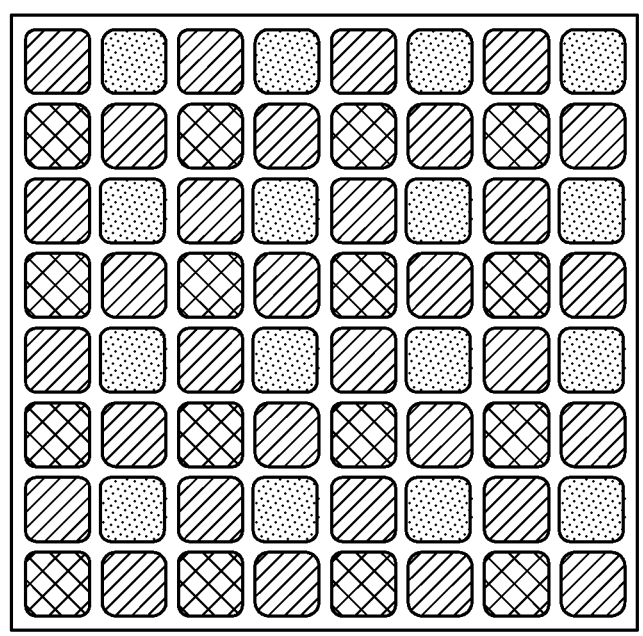
FIGS. 3A and 3B are view of examples of pixels applied to an image sensor according to at least one example embodiment.
Figure 3B:
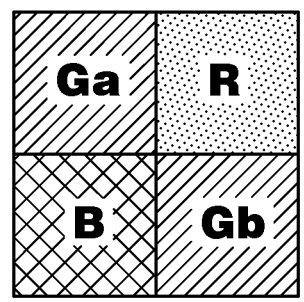

An example embodiment of the pixel array 110 of the image sensor 100 of FIG. 1 will be described below. FIGS. 3A and 3B are views of examples of pixels, applied to the image sensor 100.

As illustrated in FIG. 3A, the pixel array 110 may include a plurality of pixels arranged in a plurality of rows and columns. For example, a unit pixel group Group_pix defined by the pixels arranged in two rows and two columns may include four pixels. The pixel array 110 may include a color filter through which each pixel may sense various colors. FIG. 3B illustrates an example in which the color filter includes filters for sensing red, green, and blue colors. Here, a unit pixel group may include one red pixel R, one blue pixel B, and two green pixels Ga and Gb. However, example embodiments are not limited thereto, and the pixel array 110 according to example embodiments may include various types of color filters. For example, the color filter may include filters for sensing yellow, cyan, magenta, and green colors. Alternatively, the color filter may include filters for sensing red, green, blue, and white colors.

Figure 4A:
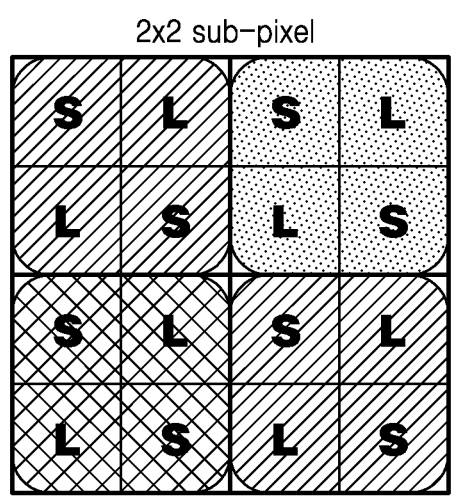
FIGS. 4A and 4B are views of examples of a unit pixel group of FIG. 3.
Figure 4B:
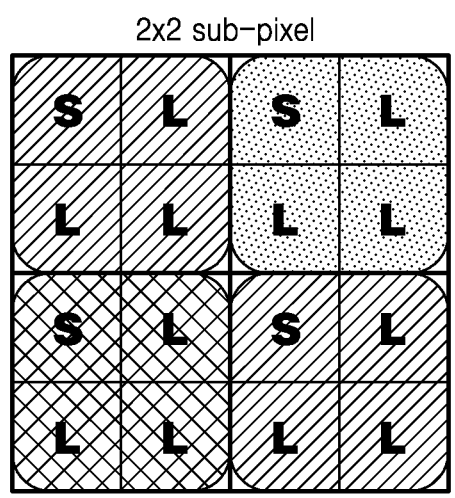

FIGS. 4A and 4B are views of examples of the unit pixel group of FIG. 3. FIGS. 4A and 4B illustrate examples in which one pixel includes four photodiodes. Since an area of one pixel, which corresponds to one photodiode, is defined as a sub-pixel, one pixel may be understood to include four sub-pixels.

As illustrated in FIGS. 4A and 4B, one pixel may include a plurality of sub-pixels, and the sub-pixel including a photodiode which is exposed to light for a long period of time may be defined as a first sub-pixel L and a sub-pixel including a photodiode which is exposed to light for a short period of time may be defined as a second sub-pixel S.

FIG. 4A illustrates the example in which one pixel includes the same numbers of first sub-pixels L and second sub-pixels S, while FIG. 4B illustrates the example in which one pixel includes the first sub-pixels L and the second sub-pixels S, wherein the numbers of first sub-pixels L and the second sub-pixels S are different from each other. For example, FIG. 4B illustrates the example in which the number of first sub-pixels L is greater than the number of second sub-pixels S. Also, for example, when a pixel includes 2×2 sub-pixels and the number of first sub-pixels L is greater than the number of second sub-pixels S, the pixel may include three first sub-pixels L and one second sub-pixel S.

Figure 5A:
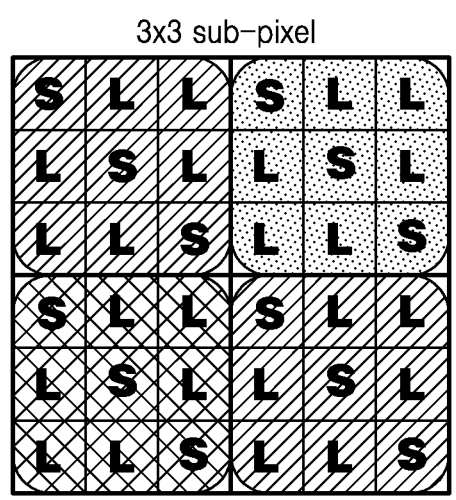
Figure 5B:
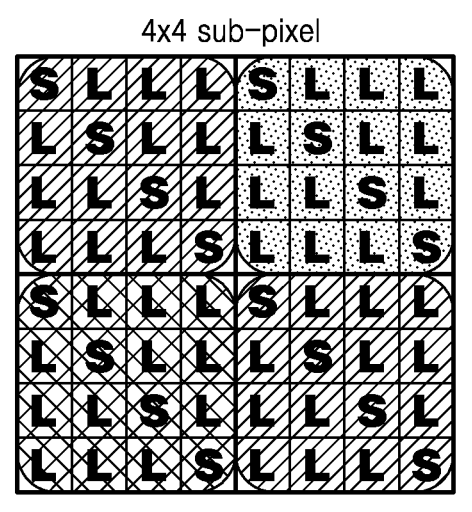

FIGS. 5A and 5B are views of other examples of the unit pixel group of FIG. 3. FIGS. 5A and 5B illustrate examples in which one pixel includes various numbers of sub-pixels.

For example, FIG. 5A illustrates the example in which one pixel includes nine sub-pixels, and the pixel may include one or more first sub-pixels L and one or more second sub-pixels S. According to at least one example embodiment, the number of first sub-pixels L may be greater than the number of second sub-pixels S in one pixel. For example, one pixel may include six first sub-pixels L and three second sub-pixels S.

As another example, FIG. 5B illustrates the example in which one pixel includes sixteen sub-pixels, and the pixel may include one or more first sub-pixels L and one or more second sub-pixels S. According to at least one example embodiment, the number of first sub-pixels L may be greater than the number of second sub-pixels S in one pixel. For example, the pixel may include twelve first sub-pixels L and four second sub-pixels S.

Figure 6:
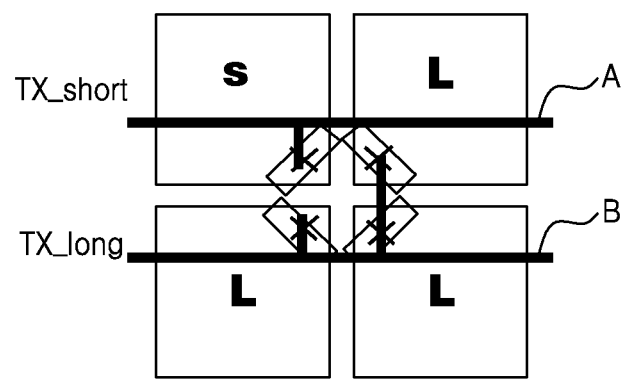
FIGS. 6 and 7 are views of a pixel circuit of a pixel of an image sensor according to at least one example embodiment.
Figure 7:
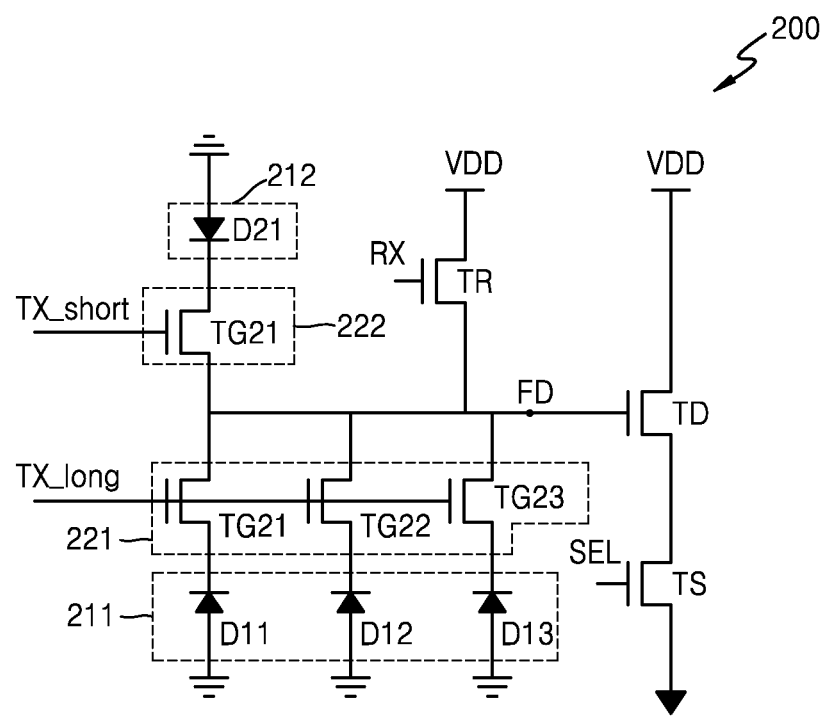

FIGS. 6 and 7 are views of a pixel circuit realizing a pixel of an image sensor according to at least one example embodiment. FIG. 6 is a structural diagram of the pixel circuit, and FIG. 7 is a circuit diagram of an example of devices included in the pixel circuit. Meanwhile, it is assumed in FIGS. 6 and 7 that one pixel includes four sub-pixels. Also, in the structural diagram of the pixel circuit of FIG. 6, the example in which the pixel includes three first sub-pixels L and one second sub-pixel S is illustrated.

As illustrated in FIG. 6, the pixel circuit includes the three first sub-pixels L, each of which includes a photodiode, and the one second sub-pixel S including a photodiode. Also, a signal line A for transmitting a first transfer control signal TX_long and a signal line B for transmitting a second transfer control signal TX_short are arranged on the pixel circuit, and the three first sub-pixels L transfer photocharges to a floating diffusion area in response to the first transfer control signal TX_long, and the one second sub-pixel S transfers photocharges to the floating diffusion area in response to the second transfer control signal TX_short. Since the photocharges accumulated in the photodiodes of the three first sub-pixels L are transferred to the floating diffusion area, the photocharges from the three photodiodes may be summed in the floating diffusion area. After an electrical signal according to a result of the summation is output as a pixel signal, a reset operation may be performed with respect to the floating diffusion area. Thereafter, the photocharges accumulated in the photodiode of the one second sub-pixel S are transferred to the floating diffusion area, and an electrical signal according to this transferring of the photocharges may be output as a pixel signal.

Figure 8:
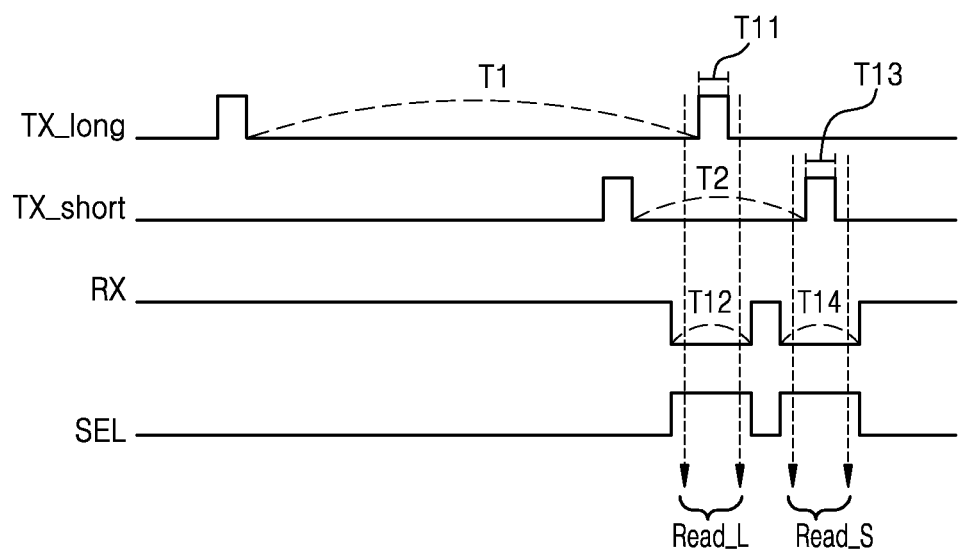
FIGS. 8 and 9 are waveform diagrams of various operation examples of a pixel circuit according to at least one example embodiment.
Figure 9:
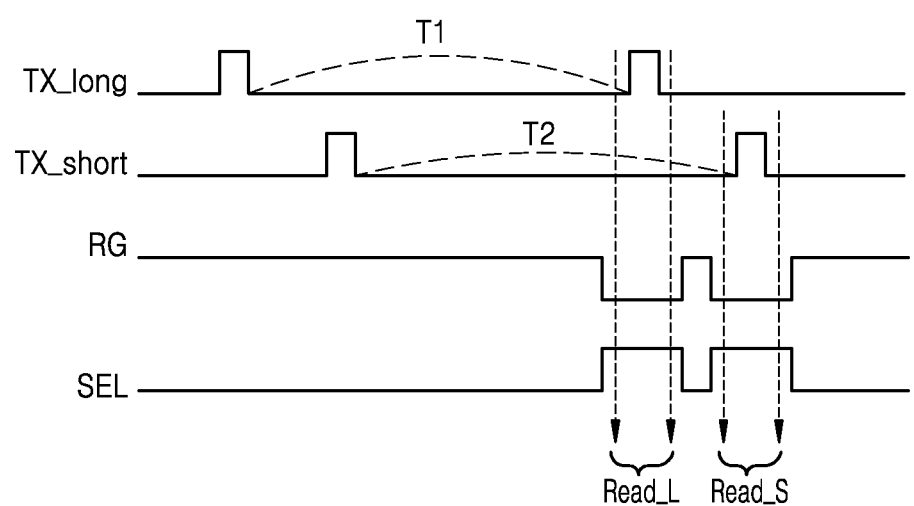

An example of an operation of a pixel circuit 200 of FIG. 7 will be described with reference to FIGS. 8 and 9. FIGS. 8 and 9 are waveform diagrams of examples of various operations of the pixel circuit 200.

The pixel circuit 200 includes a plurality of photodiodes accumulating photocharges, and the plurality of photodiodes may be divided into two or more photocharge accumulation units (or photocharge accumulators) according to methods of accumulating photocharges. For example, the pixel circuit 200 may include a first photocharge accumulation unit (or photocharge accumulator) 211 including one or more photodiodes (or light sensors), and a second photocharge accumulation unit (or photocharge accumulator) 212 including one or more photodiodes (or light sensors). For example, the first photocharge accumulation unit 211 may include first through third photodiodes D11 through D13 and the second photocharge accumulation unit 212 may include one photodiode D21.

Also, the pixel circuit 200 may further include a first transfer control unit (or first transfer controller or first switch circuitry) 221 for transferring photocharges accumulated in the first photocharge accumulation unit 211, and a second transfer control unit (or second transfer controller or second switch circuitry) 222 for transferring photocharges accumulated in the second photocharge accumulation unit 212. The first transfer control unit 221 may include first through third transfer transistors TG11 through TG13 corresponding to the first through third photodiodes D11 through D13 of the first photocharge accumulation unit 211, and the second transfer control unit 222 may include a transfer transistor TG21 corresponding to the photodiode D21 of the second photocharge accumulation unit 212. The first through third transfer transistors TG11 through TG13 may be commonly controlled by a first transfer control signal TX_long, and the transfer transistor TG21 of the second transfer control unit 222 may be controlled by a second transfer control signal TX_short.

Also, the pixel circuit 200 may further include a floating diffusion area FD receiving the photocharges from the first and second photocharge accumulation units 211 and 212, a driving transistor TD, a gate of which is connected to the floating diffusion area FD, a reset transistor (or reset circuitry) TR resetting a potential of the floating diffusion area FD as a power voltage level VDD, and a selection transistor (or selection circuitry) TS for transmitting an electrical signal from the driving transistor TD via a column line, as a pixel signal.

The first and second photocharge accumulation units 211 and 212 may be realized in various forms, and may operate in various manners in order to generate pixel data of high sensitivity and pixel data of low sensitivity. For example, the first and second transfer control units 221 and 222 may be controlled such that the first through third photodiodes D11 through D13 of the first photocharge accumulation unit 211 are exposed to light for a longer period of time than the photodiode D21 of the second photocharge accumulation unit 212.

Also, the photodiodes D11 through D13 of the photocharge accumulation unit 211, and D21 of the second photocharge accumulation unit 212 may be formed to have the same sizes. Also, the first photocharge accumulation unit 211 may include more photodiodes than the second photocharge accumulation unit 212. Accordingly, when light of the same intensity is sensed, an amount of photocharges accumulated in the first photocharge accumulation unit 211 may be greater than an amount of photocharges accumulated in the second photocharge accumulation unit 212.

Meanwhile, as illustrated in FIG. 7, a plurality of sub-pixels included in one pixel circuit may have a structure in which the plurality of sub-pixels share the driving transistor TD, the reset transistor TR, and the selection transistor TS. Also, since the first through third transfer transistors TG11 through TG13 are commonly controlled by the first transfer control signal TX_long, the photocharges accumulated in the first through third photodiodes D11 through D13 may be summed in the floating diffusion area FD.

The driving transistor TD may function as a source follower-buffer amplifier having a desired (or alternatively, predetermined) voltage gain (for example, a voltage gain of 1), and generate a current between a source and a drain in proportion to the photocharges transferred to the floating diffusion area FD. An electrical signal from the driving transistor TD may be provided via a column line as a pixel signal, via the selection transistor TS.

First, as an example of the operation of the pixel circuit 200, as illustrated in the timing view of FIG. 8, the first transfer control signal TX_long for controlling the transfer transistors TG11 through TG13 of the first transfer control unit 221 may have waveforms in which the first through third photodiodes D11 through D13 of the first photocharge accumulation unit 211 accumulate photocharges for a first time period (or first exposure time period) T1 which is relatively long. On the contrary, the second transfer control signal TX_short for controlling the transfer transistor TG21 of the second transfer control unit 222 may have waveforms in which the photodiode D21 of the second photocharge accumulation unit 212 accumulates photocharges for a second time period (or second exposure time period) T2 which is relatively short (e.g., compared to the first time period T1).

When the light exposure with respect to the photodiodes D11 through D13 and D21 for desired (or alternatively, predetermined) time periods is completed, an operation of outputting a pixel signal according to the photocharges accumulated in the photodiodes D11 through D13 and D21 is performed. For example, the pixel signal may be generated by the correlated double sampling operation, according to one example embodiment. In order to generate a first pixel signal Read_L having high sensitivity, the first transfer control signal TX_long may have a logic high value during a desired (or alternatively, predetermined) section (for example, a first transfer section T11) so that the photocharges accumulated in the first through third photodiodes D11 through D13 of the first photocharge accumulation unit 211 are transferred to the floating diffusion area FD. Also, a reset control signal RG may have a logic low value so that the reset transistor TR is turned off during a section (for example, a first read section or first read time period T12) including the first transfer section or first transfer time period T11. In addition, a selection control signal SEL may have a logic high value during the first read section T12 so that the pixel signal is output by the correlated double sampling operation during the first read section T12.

During the first read section T12, an electrical signal corresponding to a potential of the floating diffusion area FD which is reset as a desired (or alternatively, predetermined) power voltage level VDD according to a reset operation, and an electrical signal corresponding to a potential of the floating diffusion area FD after the photocharges accumulated in the first through third photodiodes D11 through D13 are transferred to the floating diffusion area FD, may be provided as the first pixel signal Read_L, according to the light exposure for a long period of time.

Thereafter, in order to generate a second pixel signal Read_S having low sensitivity, the second transfer control signal TX_short may have a logic high value during a desired (or alternatively, predetermined) section (for example, a second transfer section T13) so that the photocharges accumulated in the photodiode D21 of the second photocharge accumulation unit 212 are transferred to the floating diffusion area FD. Also, the reset control signal RG may have a logic low value so that the reset transistor TR is turned off during a section (for example, a second read section or a second read time period T14) including the second transfer section or second transfer time period T13. In addition, the selection control signal SEL may have a logic high value during the second read section T14 so that a pixel signal is output by a correlated double sampling operation during the second read section T14.

During the second read section T14, an electrical signal corresponding to a potential of the floating diffusion area FD which is reset as a desired (or alternatively, predetermined) power voltage level VDD according to a reset operation, and an electrical signal corresponding to a potential of the floating diffusion area FD after the photocharges accumulated in the photodiode D21 are transferred to the floating diffusion area FD, may be provided as the second pixel signal Read_S, according to the light exposure for a short period of time.

According to the above described operations, first pixel data having high sensitivity due to the light exposure for a long period of time and second pixel data having low sensitivity due to the light exposure for a short period of time may be generated. Also, by a synthesis operation of the first and second pixel data, final image data with an improved dynamic range may be generated.

Meanwhile, as another example of the operation of the pixel circuit 200, as illustrated in FIG. 9, waveforms of the first transfer control signal TX_long and the second transfer control signal TX_short may be set such that a time period in which the first photocharge accumulation unit 211 accumulates photocharges and a time period in which the second photocharge accumulation unit 212 accumulates photocharges are substantially the same. Also, similarly to the above described example embodiment, when the photocharge accumulating operations of the first photocharge accumulation unit 211 and the second photocharge accumulation unit 212 are completed, the first pixel signal Read_L is generated according to the photocharges accumulated in the first through third photodiodes D11 through 13 of the first photocharge accumulation unit 211, and the second pixel signal Read_S is generated according to the photocharges accumulated in the photodiode D21 of the second photocharge accumulation unit 212.

According to FIG. 9, even if the first through third photodiodes D11 through D13 of the first photocharge accumulation unit 211 and the photodiode D21 of the second photocharge accumulation unit 212 are exposed to light for the same period of time, the photocharges from the first photocharge accumulation unit 211, which has a greater number of photodiodes than the second photocharge accumulation unit 212, are summed in the floating diffusion area FD, and thus, the pixel signal of the first photocharge accumulation unit 211 may have high sensitivity. Accordingly, the pixel circuit 200 may operate so as to have the same or substantially the same effects as the example embodiment illustrated in FIG. 8, and an image having a wide dynamic range may be generated.

Meanwhile, according to the above-described example embodiments, the examples in which the photocharges from the plurality of photodiodes are summed in the same floating diffusion area (for example, a summation method in a charge domain) to generate the pixel signal having high sensitivity, are described. However, example embodiments are not limited thereto.

In other example embodiments, the photocharges from the first through third photodiodes D11 through D13 of the first photocharge accumulation unit 211 may be summed or averaged in an analog domain. For example, the photocharges from each of the first through third photodiodes D11 through D13 may be provided to different floating diffusion areas (for example, three floating diffusion areas) according to an additional adjustment. A pixel signal corresponding to a potential of each of the floating diffusion areas may be provided through an output end, and the pixel signal provided via the output end may correspond to the summed or averaged value of the photocharges accumulated in the first through third photodiodes D11 through D13.

According to another example embodiment, the photocharges from the first through third photodiodes D11 through D13 of the first photocharge accumulation unit 211 may be summed or averaged in a digital domain. For example, since the photocharges from each of the first through third photodiodes D11 through D13 may be provided to a floating diffusion area at each different timing, and thus, pixel data corresponding to each of the first through third photodiodes D11 through D13 may be generated, and by a digital processing operation (e.g., sampling) with respect to the pixel data, data corresponding to the summed or averaged value of the photocharges accumulated in the first through third photodiodes D11 through D13 may be generated.

It should be understood that the controller 150 from FIG. 1 may provide the signals discussed with reference to FIGS. 7-9.

Figure 10:
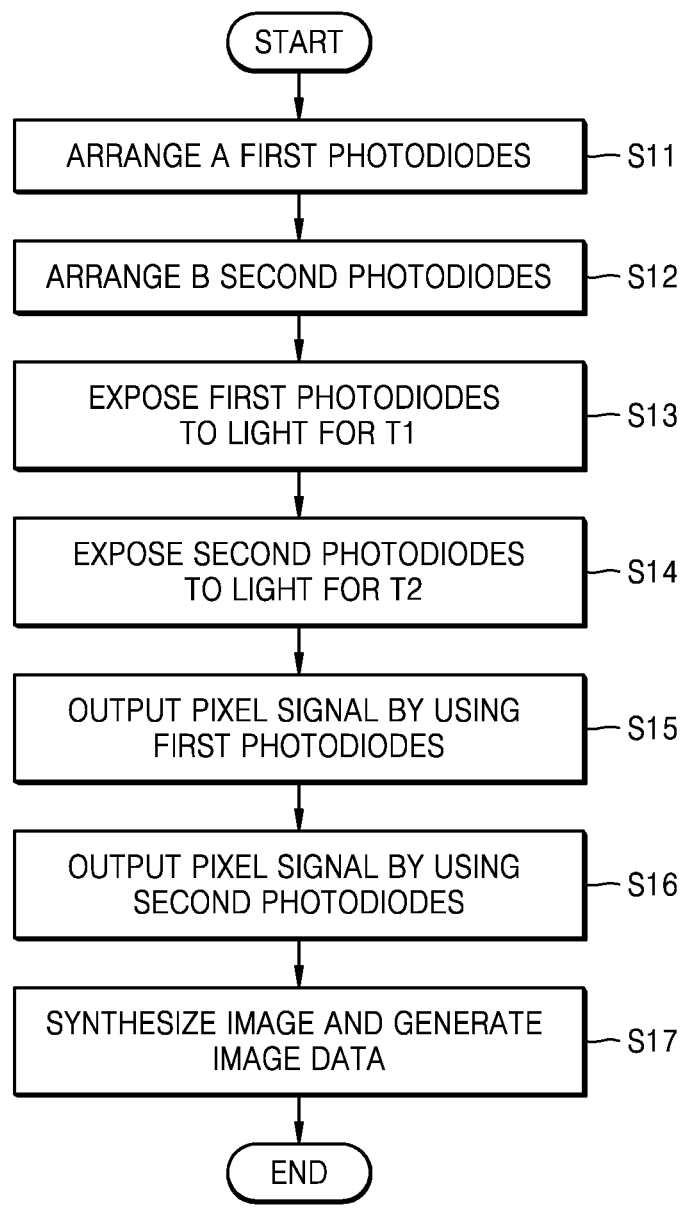
FIG. 10 is a flowchart of a method of operating an image sensor, according to at least one example embodiment.

FIG. 10 is a flowchart of a method of operating an image sensor, according to at least one example embodiment.

As illustrated in FIG. 10, in order to realize the image sensor, first, a plurality of pixels are formed, and a plurality of photodiodes are arranged in each of the plurality of pixels. For example, in order to generate a pixel signal having high sensitivity. A first photodiodes are arranged in operation S11, and in order to generate a pixel signal having low sensitivity, B second photodiodes are arranged in operation S12. The A first photodiodes may form the first photocharge accumulation unit of the above-described example embodiment, and the B second photodiodes may form the second photocharge accumulation unit of the above-described example embodiment. Also, as in the above-described example embodiment, the number of first photodiodes may be greater than the number of second photodiodes, in one pixel. Also, in other example embodiments, the number of first photodiodes and the number of second photodiodes may be the same.

A light exposure operation is performed with respect to the photodiodes of the pixel so that an image sensor has a wide dynamic range. For example, the first photodiodes are exposed to light for a first time period T1 in operation S13, and the second photodiodes are exposed to light for a second time period T2 in operation S14. As in the above described example embodiment, the first time period T1 for which the first photodiodes are exposed to light may be longer than the second time period T2 for which the second diodes are exposed to light. Also, in other example embodiments, the first time period T1 for which the first photodiodes are exposed to light and the second time period T2 for which the second photodiodes are exposed to light may be the same. Preferably, for the pixel signal from the A first photodiodes to have high sensitivity, the number of first photodiodes and the number of second photodiodes may be adjusted, or the light exposure time period of the first photodiode and the second photodiode may be adjusted.

After the light exposure operation with respect to the first photodiodes and the second photodiodes is completed, an operation of outputting a pixel signal corresponding to photocharges accumulated in the first photodiodes and the second photodiodes may be performed. For example, the photocharges accumulated in the one or more first photodiodes are summed in a floating diffusion area and the pixel signal corresponding to the summed photocharges is output, in operation S15. Also, the pixel signal corresponding to the photocharges accumulated in the second photodiodes is output in operation S16. As shown above, a synthesis operation with respect to an image according to the pixel data of high sensitivity and an image according to the pixel data of low sensitivity may be performed, and thus, image data may be generated, in operation S17.

Figure 11A:
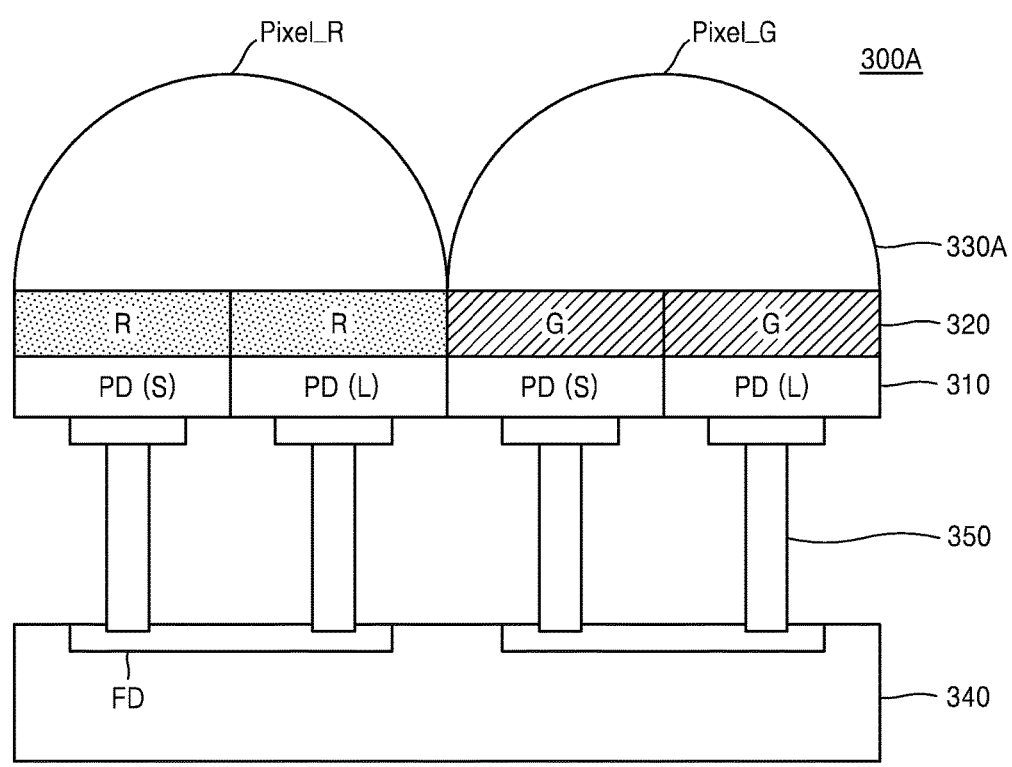
FIGS. 11A and 11B are views of an embodiment of an image sensor according to at least one example embodiment.
Figure 11B:
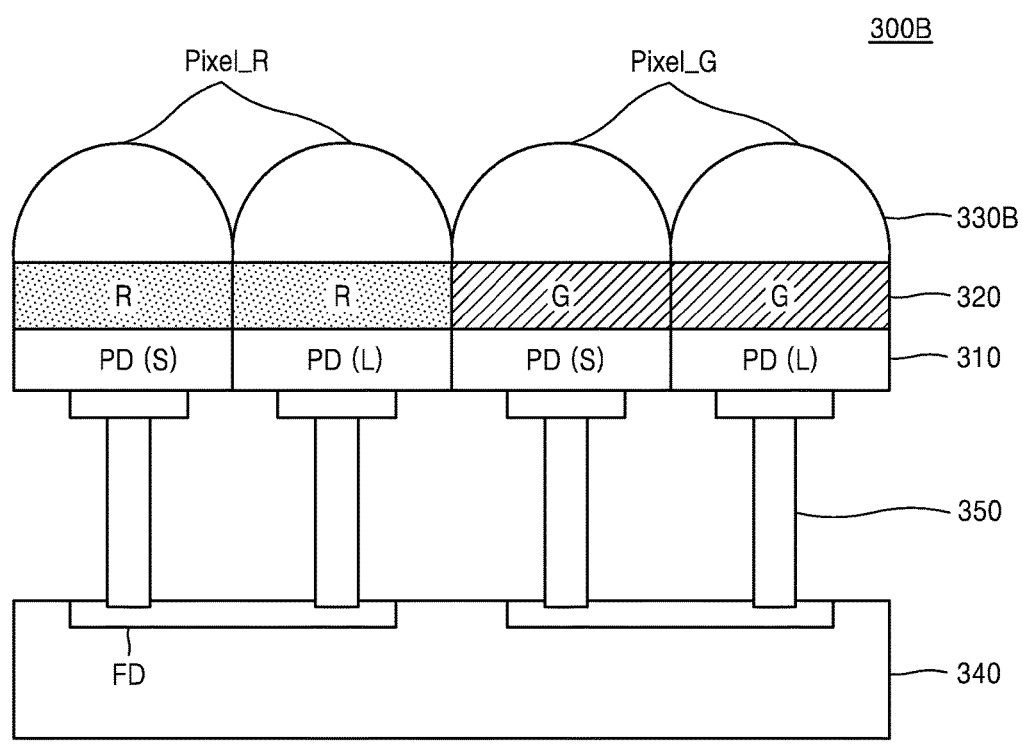

FIGS. 11A and 11B are views of image sensors 300A and 300B according to at least one example embodiment. FIGS. 11A and 11B illustrate a red pixel and a green pixel, for example, from among a plurality of pixels included in the image sensor. Also, FIGS. 11A and 11B illustrate that one pixel includes 2×2 sub-pixels. Since FIGS. 11A and 11B are cross-sectional views of a pixel circuit, in FIGS. 11A and 11B, two sub-pixels may be illustrated for one pixel.

As illustrated in FIGS. 11A and 11B, the image sensors 300A and 300B may include a plurality of photodiodes 310, a plurality of color filters 320, and a plurality of micro-lenses 330A and 330B. Also, although not illustrated in FIGS. 11A and 11B, a floating diffusion area (not shown) receiving photocharges from the plurality of photodiodes 310 may be formed on a substrate on which the plurality of photodiodes 310 are arranged.

One pixel may include four sub-pixels. FIGS. 11A and 11B illustrate two sub-pixels in correspondence to one pixel. However, the red pixel Pixel_R may include three first sub-pixels generating a pixel signal of high sensitivity, and one second sub-pixel generating a pixel signal of low sensitivity. Accordingly, the red pixel Pixel_R may include first photodiodes PD(L) corresponding to the three first sub-pixels, and a second photodiode PD(S) corresponding to the one second sub-pixel. The green pixel Pixel_G may include the sub-pixels in a same or similar manner.

As illustrated in FIG. 11A, the plurality of micro-lenses 330A may be arranged in correspondence to the plurality of pixels. For example, one micro-lens may be arranged in correspondence to one pixel. Since one micro-lens is arranged in correspondence to a plurality of sub-pixels, information about potential differences among the sub-pixels may be generated, and thus, depth information may be determined, and auto focusing may be performed.

In other example embodiments, the image sensor 300B may include a plurality of micro-lenses 330B in correspondence to a plurality of sub-pixels, as illustrated in FIG. 11B. For example, one micro-lens 330B may be arranged in correspondence to one sub-pixel. The photodiodes PD(L) of the first sub-pixels, which are exposed to light for a long period of time, may have the same size as the photodiode PD(S) of the second sub-pixel, which is exposed to light for a short period of time. Accordingly, sizes of the micro-lenses 330B arranged in correspondence to the sub-pixels may be the same, and thus, a manufacturing process of the micro-lenses 330B may be relatively easy. Also, when the sizes of the micro-lenses are different from one another, a pixel having a large-sized lens may affect a pixel having a small-sized lens, and thus, shading may occur. However, according to example embodiments, shading occurrences may be reduced.

Figure 12:
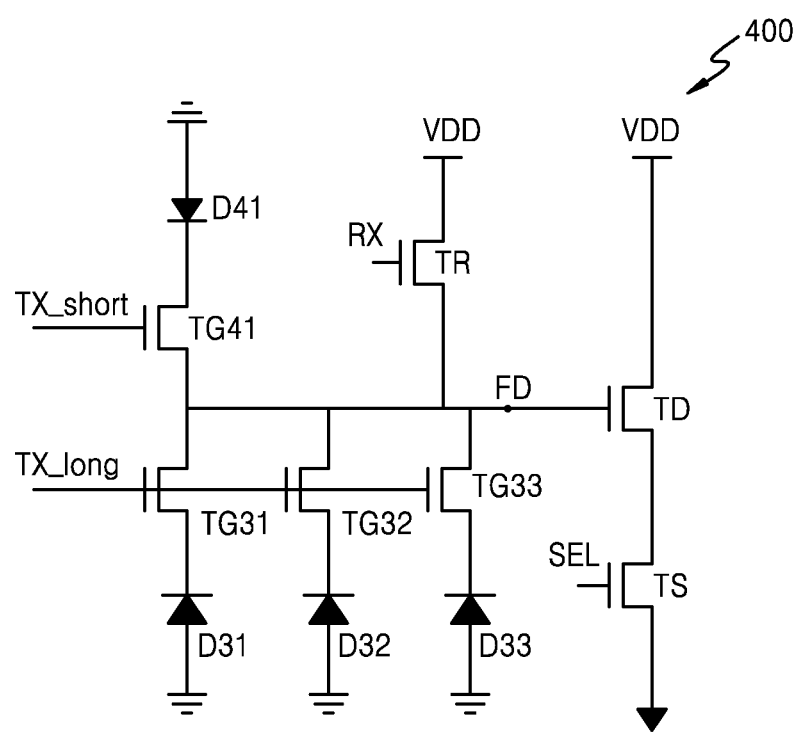
FIG. 12 is a circuit diagram of a pixel circuit according to at least one example embodiment.

FIG. 12 is a circuit diagram of a pixel circuit 400 according to at least one example embodiment.

As illustrated in FIG. 12, the pixel circuit 400 may include a plurality of photodiodes, and a plurality of transfer transistors corresponding to the plurality of photodiodes. The plurality of photodiodes may include one or more photodiodes D31 through D33 having a relatively large size, and one or more photodiodes D41 having a relatively small size (e.g., compared to photodiodes D31 through D33). The photodiodes D31 through D33 may form a first photocharge accumulation unit providing a pixel signal of high sensitivity, and the photodiode D41 may form a second photocharge accumulation unit providing a pixel signal of low sensitivity.

Also, the plurality of transfer transistors may include transfer transistors TG31 through TG33 for transferring photocharges accumulated in the photodiodes D31 through D33 forming the first photocharge accumulation unit, and a transfer transistor TG41 for transferring photocharges accumulated in the second photodiode D41 forming the second photocharge accumulation unit. FIG. 12 illustrates that the number of photodiodes D31 through D33 of the first photocharge accumulation unit is greater than the number of photodiodes D41 of the second photocharge accumulation unit, in one pixel. However, example embodiments are not limited thereto, and the number of photodiodes D31 through D33 of the first photocharge accumulation unit and the number of photodiodes D41 of the second photocharge accumulation unit may be the same.

In addition, the pixel circuit 400 may further include a floating diffusion area FD, a driving transistor TD, a reset transistor TR, and a selection transistor TS. Also, the transfer transistors TG31 through TG33 may be controlled by the same first transfer control signal TX_long, and the transfer transistor TG41 may be controlled by a second transfer control signal TX_short.

Similar to the above described example embodiments, in order to provide a wide dynamic range, the pixel circuit 400 may provide a pixel signal of high sensitivity and a pixel signal of low sensitivity. According to at least one example embodiment, since the photodiodes D31 through D33 of the first photocharge accumulation unit have a greater size than the photodiode D41 of the second photocharge accumulation unit, the pixel signal of relatively high sensitivity may be provided by the photodiodes D31 through D33 of the first photocharge accumulation unit, even if the number of photodiodes D31 through D33 of the first photocharge accumulation unit and the number of photodiodes D41 of the second photocharge accumulation unit are the same. Also, even if the photodiodes D31 through D33, and D41 are exposed to light for the same period of time, the pixel signal of relatively high sensitivity may be provided by the photodiodes D31 through D33 of the first photocharge accumulation unit.

Figure 13A:
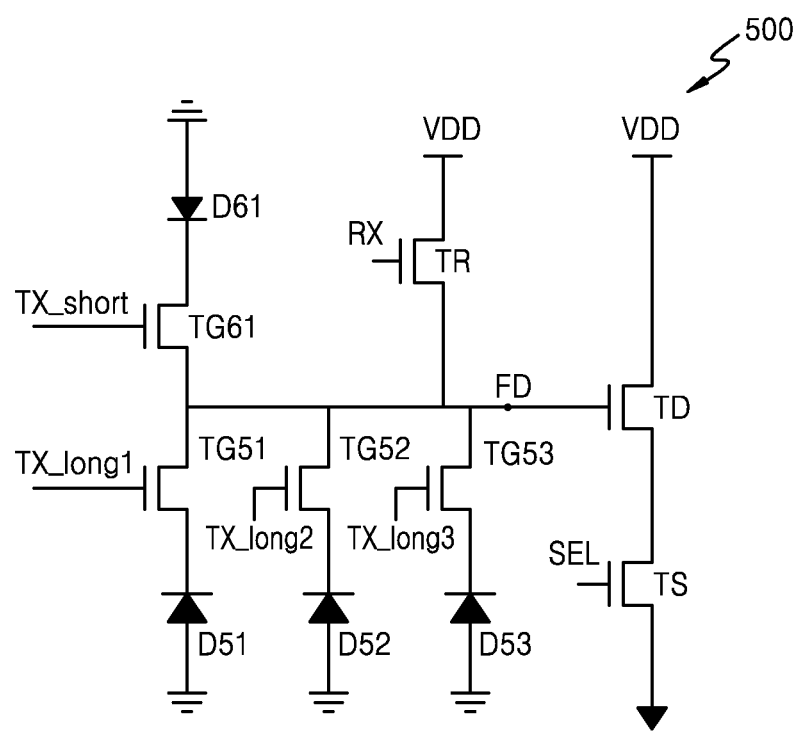
FIGS. 13A and 13B are a circuit diagram of a pixel circuit and a waveform diagram of an operation of the pixel circuit according to at least one example embodiment.
Figure 13B:
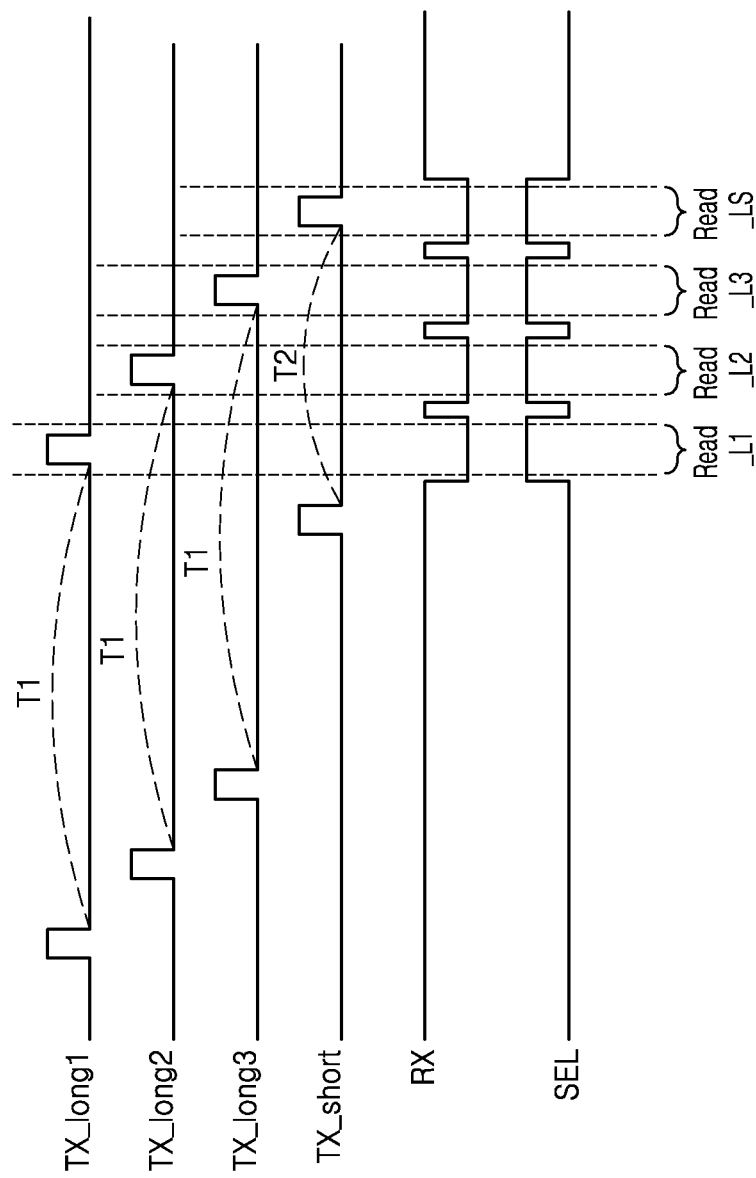

FIGS. 13A and 13B are a circuit diagram of a pixel circuit 500 and a waveform diagram of an operation of the pixel circuit 500 according to at least one example embodiment.

As illustrated in FIG. 13A, the pixel circuit 500 may include a plurality of photodiodes, and a plurality of transfer transistors corresponding to the plurality of photodiodes. The plurality of photodiodes may include one or more photodiodes D51 through D53 exposed to light for a relatively long period of time, and one or more photodiodes D61 exposed to light for a relatively short period of time. The photodiodes D51 through D53 may form a first photocharge accumulation unit providing a pixel signal of high sensitivity, and the photodiode D61 may form a second photocharge accumulation unit providing a pixel signal of low sensitivity. For example, the first photocharge accumulation unit may include the first through third photodiodes D51 through D53.

Also, the plurality of transfer transistors may include first through third transfer transistors TG51 through TG53 for transferring photocharges accumulated in the first through third photodiodes D51 through D53, and a transfer transistor TG61 for transferring photocharges accumulated in the photodiode D61. Similarly to the above described example embodiments, the first through third photodiodes D51 through D53 of the first photocharge accumulation unit and the photodiode D61 of the second photocharge accumulation unit may be formed to have various sizes and numbers.

In addition, the pixel circuit 500 may further include a floating diffusion area FD, a driving transistor TD, a reset transistor TR, and a selection transistor TS. Also, the first through third transfer transistors TG51 through TG53 may be controlled by different transfer control signals TX_long1 through TX_long3, and the transfer transistor TG61 may be controlled by a transfer control signal TX_short.

Meanwhile, referring to FIG. 13B, each of the photodiodes D51 through D53 of the first photocharge accumulation unit may accumulate photocharges for a first time period T1, which is relatively long, according to waveforms of the first through third transfer control signals TX_long1 through TX_long3, while the photodiode D61 of the second photocharge accumulation unit may accumulate photocharges for a second time period T2, which is relatively short, according to a waveform of the transfer control signal TX_short, which is for transferring the photocharges of the second photocharge accumulation unit. Also, since the first through third transfer transistors TG51 through TG53 are controlled separately, the photocharges accumulated in each of the photodiodes D51 through D53 of the first photocharge accumulation unit may be transferred to the floating diffusion area FD at the same timing or at different timings.

First, in order to generate a pixel signal of high sensitivity, the first transfer control signal TX_long1 has a logic high level, and thus, an electrical signal corresponding to the photocharges accumulated in the first photodiode D51 may be provided as a pixel signal Read_L1 according to a light exposure for a long period of time. Also, the second transfer control signal TX_long2 has a logic high level sequentially, and thus, an electrical signal corresponding to the photocharges accumulated in the second photodiode D52 may be provided as a pixel signal Read_L2 according to a light exposure for a long period of time. Also, the third transfer control signal TX_long3 has a logic high level sequentially, and thus, an electrical signal corresponding to the photocharges accumulated in the third photodiode D53 may be provided as a pixel signal Read_L3 according to a light exposure for a long period of time.

Then, in order to generate a pixel signal of low sensitivity, the transfer control signal TX_short has a logic high level, and thus, the photocharges accumulated in the photodiode D61 of the second photocharge accumulation unit is provided to the floating diffusion area FD, and an electrical signal corresponding to a potential of the floating diffusion area FD may be provided as a pixel signal Read_S according to a light exposure for a short period of time.

According to the example embodiment of FIGS. 13A and 13B, the photocharges accumulated in the first through third photodiodes D51 through D53 may be summed in the floating diffusion area FD, according to the waveforms of the first through third transfer control signals TX_long1 through TX_long3. Alternatively, the photocharges accumulated in the first through third photodiodes D51 through D53 may be transferred to the floating diffusion area FD at different timings, and an operation of summing or averaging may be performed in a digital domain with respect to pixel data corresponding to the first through third photodiodes D51 through D53.

Figure 14A:
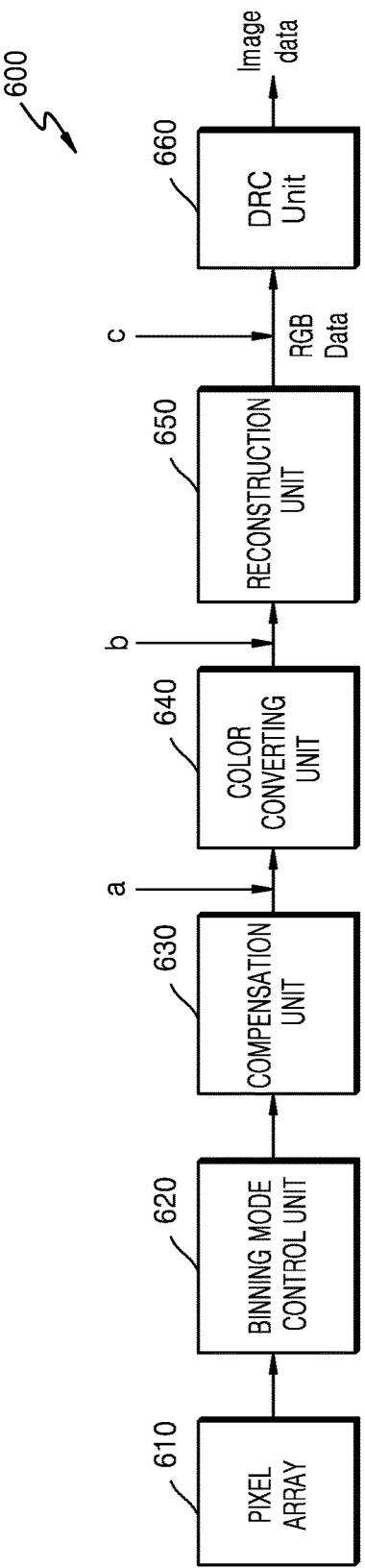
FIGS. 14A and 14B are block diagrams of an image sensor and an example of a binning operation according to at least one example embodiment.
Figure 14B:
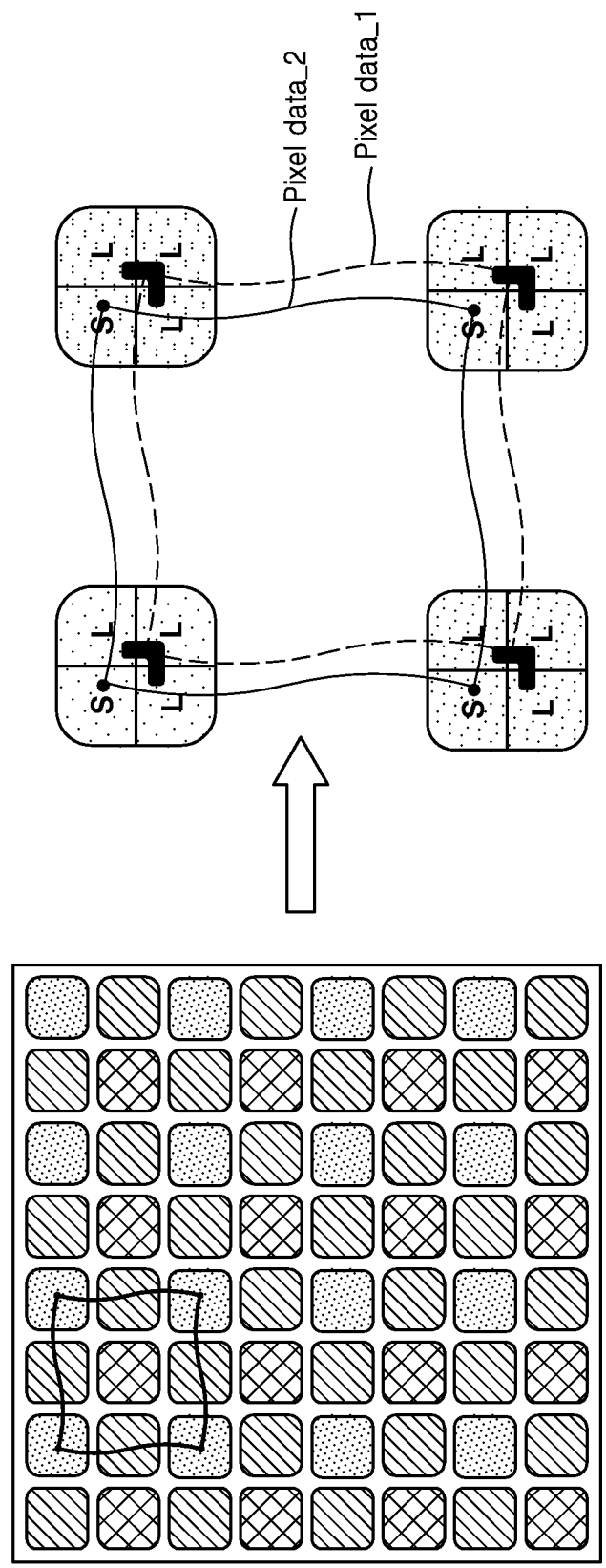

FIGS. 14A and 14B are block diagrams of an image sensor 600 and an example of a binning operation, according at least one example embodiment. The image sensor 600 of FIG. 14A may include a pixel array 610, a binning mode control unit (or binning mode controller) 620, a compensation unit (or compensator) 630, a color converting unit (or color converter) 640, a reconstruction unit (a reconstructor) 650, and a dynamic range compression (DRC) unit (or dynamic range compressor) 660.

The pixel array 610 may include the pixels described in the above example embodiments (e.g., a pixel array 110 of FIG. 1 being driven by controller 150), and thus, each of the pixels included in the pixel array 610 may include a plurality of photodiodes. Also, some of the plurality of photodiodes may be used to generate a pixel signal of high sensitivity, and others may be used to generate a pixel signal of low sensitivity. For example, some of the plurality of photodiodes may be exposed to light for a relatively long period of time, while others may be exposed to light for a relatively short period of time. Also, the number of photodiodes which are exposed to light for a long period of time may be greater than the number of photodiodes which are exposed to light for a short period of time, from among the plurality of photodiodes.

Also, at least some of function blocks illustrated in FIG. 14A may be components included in the image processing unit 140 of FIG. 1. For example, at least some of the binning mode control unit 620, the compensation unit 630, the color converting unit 640, the reconstruction unit 650, and the DRC unit 660 may be included in the image processing unit 140 of FIG. 1, and others may receive the pixel data from the read circuit 130 of FIG. 1, perform a desired (or alternatively, predetermined) processing operation with respect to the received pixel data, and provide a processing result to the image processing unit 140.

Under a control of the binning mode control unit 620, when a high image quality mode is selected (e.g., by a user), pixel data having a relatively high resolution may be provided to the compensation unit 630, and when a low image quality mode is selected, pixel data having a relatively low resolution may be provided to the compensation unit 630. That is, according to the binning mode, pixel data from all pixels included in the pixel array 610 may be used, or pixel data from some of the pixels may be used.

The compensation unit 630 may process the received pixel data and compensate for at least one pixel. For example, in order to compensate for a desired (or alternatively, predetermined) color pixel (for example, a red pixel), the compensation operation may be performed by using pixel data of at least one adjacent pixel (for example, red, blue, and green pixels) which is adjacent to the desired (or alternatively, predetermined) color pixel. According to an example embodiment, for the compensation operation with respect to the pixel data of high sensitivity of the desired (or alternatively, predetermined) color pixel, the pixel data of high sensitivity of each of the adjacent pixels may be used. That is, the pixel data of high sensitivity generated in the desired (or alternatively, predetermined) color pixel may be compensated for by using the pixel data of high sensitivity generated in the adjacent pixels. Similarly, the pixel data of low sensitivity generated in the desired (or alternatively, predetermined) color pixel may be compensated for by using the pixel data of low sensitivity generated in the adjacent pixels.

The color converting unit 640 performs a color conversion operation which converts colors sensed from the pixel array 610 into red, green, and blue (RGB) colors. The pixel array 610 may include other types of color filters in addition to the RGB colors. For example, the color filter of the pixel array 610 may generate a pixel signal having red, green, blue, and white (RGBW) color elements or color elements of other patterns. The color converting unit 640 may perform calculations with respect to pixel data, according to a desired (or alternatively, predetermined) algorithm, in order to generate pixel data having the RGB color elements corresponding to a standard image signal.

The reconstruction unit 650 may perform an image synthesis operation as illustrated in the example embodiments, by performing a signal reconstruction process. That is, the reconstruction unit 650 may receive pixel data having different sensitivities with respect to one image, and generate and output RGB pixel data having an improved dynamic range, by using the received pixel data. The DRC unit 660 may perform a compression operation with respect to the RGB pixel data from the reconstruction unit 650, without a loss in the dynamic range. A processor (for example, a digital signal processor (DSP), etc.) may be used for a sequential process, by the compression function of the DRC unit 660.

FIG. 14B is a view of an example in which a binning operation is performed in an image sensor according to at least one example embodiment. FIG. 14B illustrates the example in which four pixels sensing the same color are grouped for grouping (or binning) pixels, in a low resolution mode.

In the low resolution mode, a plurality of pixels having the same color elements may be electrically connected to one another. Also, according to at least one example embodiment, each of the pixels may include a plurality of first sub-pixels for generating a pixel signal of high sensitivity, and at least one second sub-pixel for generating a pixel signal of low sensitivity. In performing the binning operation, when the plurality of pixels are electrically connected to one another, a structure of the first sub-pixels and the second sub-pixel for each of the pixels may be considered.

According to the above described example embodiment, with respect to the plurality of first sub-pixels in each pixel, a synthesis/averaging operation may be performed in a charge domain, and an analog/digital domain. In the low resolution mode, the first sub-pixels of the plurality of pixels may be electrically connected to one another. Also, in the low resolution mode, the second sub-pixels of the plurality of pixels may be electrically connected to one another. Accordingly, the first pixel data of high sensitivity and the second pixel data of low sensitivity may be generated in a group including the plurality of pixels electrically connected to one another.

Figure 15:
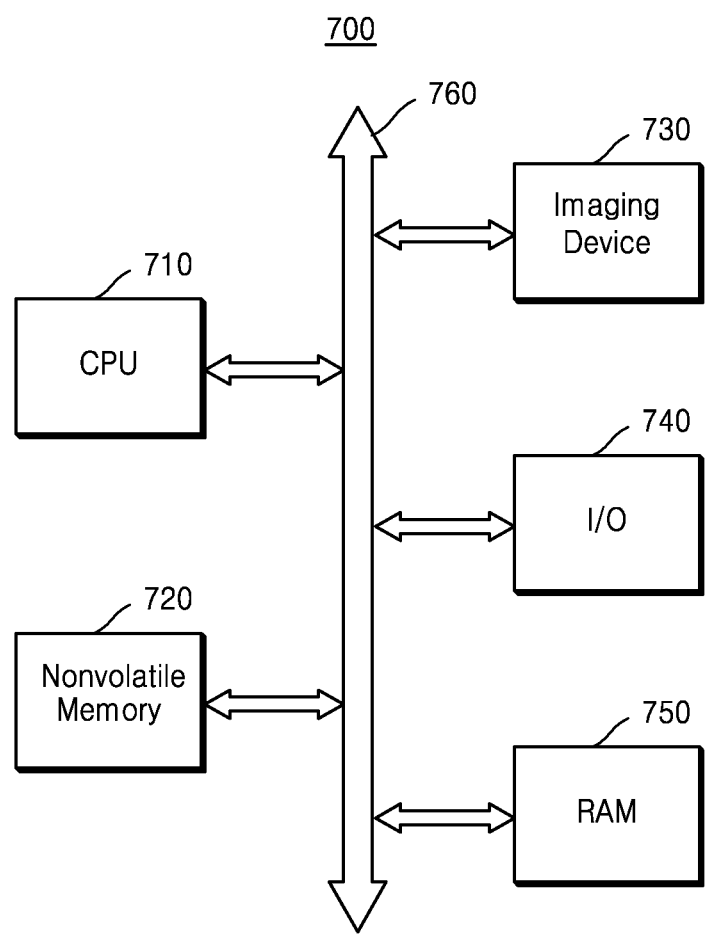
FIG. 15 is a block diagram of a system including an image sensor according to at least one example embodiment.

FIG. 15 is a block diagram of a system 700 including an image sensor according to at least one example embodiment. The system 700 of FIG. 15 may include a computer system, a camera system, a scanner, vehicle navigation, a video phone, a security system, a motion detection system, etc. requiring image data. Referring to FIG. 15, the system 700 may include a central processing device or processor 710, a non-volatile memory 720, an imaging device 730 including an image sensor, an input/output device 740, and random access memory (RAM) 750. The central processing device 710 may communicate with the non-volatile memory 720, the imaging device 730, the input/output device 740, and the RAM 750, via a bus 760.

The imaging device 730 included in the system 700 of FIG. 15 may include the image sensors according to the example embodiments. For example, the image sensor included in the imaging device 730 may include a plurality of pixels, each of which may include a plurality of photodiodes. Also, some of the plurality of photodiodes may be exposed to light for a relatively long period of time, while others may be exposed to light for a relatively short period of time. Also, the number of photodiodes exposed to light for a relatively long period of time may be greater than the number of photodiodes exposed to light for a relatively short period of time, from among the plurality of photodiodes.

Image data that is output by the imaging device 730 may be transmitted to the central processing device 710, the non-volatile memory 720, the input/output device 740, and the RAM 750, via the bus 760. The imaging device 730 according to an example embodiment may provide an improved image with a wide dynamic range.

Figure 16:
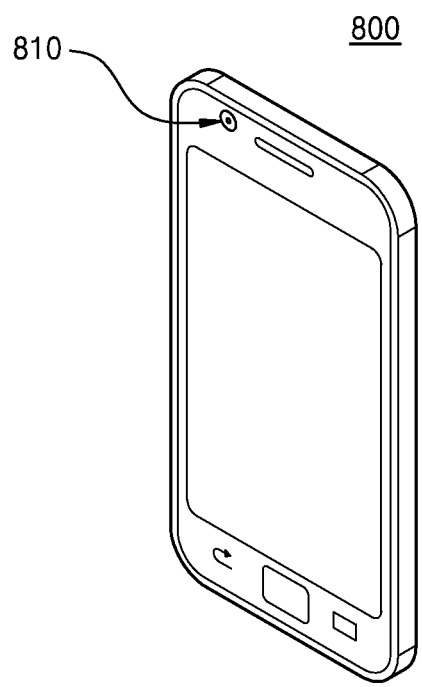
FIG. 16 is a perspective view of an electronic device including an image sensor according to at least one example embodiment.

FIG. 16 is a perspective view of an electronic device including an image sensor 810 according to at least one example embodiment.

Referring to FIG. 16, the image sensor 810 according to example embodiments may be included in a mobile phone 800. Also, the image sensor 810 may be included in electronic devices, such as a camera, a camcorder, a personal digital assistant (PDA), a wireless phone, a laptop computer, an optical mouse, a facsimile, a copying machine, etc. Also, the image sensor 810 according to example embodiments may be included in devices, such as a telescope, a mobile phone handset, an endoscope, a fingerprint identifier, a toy, a game console, a household robot, and an automobile.

While the inventive concepts have been particularly shown and described with reference to example embodiments thereof, it will be understood that various changes in form and details may be made therein without departing from the spirit and scope of the following claims.

What is claimed is:

1. A pixel circuit of an image sensor, the pixel circuit comprising:
   a first photocharge accumulator comprising at least two photodiodes configured to be exposed to light for a first period of time;
   a second photocharge accumulator comprising at least one photodiode configured to be exposed to the light for a second period of time that is shorter than the first period of time, a number of the at least two photodiodes being greater than a number of the at least one photodiode;
   at least one first transfer controller configured to transfer photocharges accumulated in the first photocharge accumulator to a floating diffusion area, the at least one first transfer controller including a plurality of first transfer controller, the plurality of first transfer controllers configured to individually control the at least two photodiodes such that the photocharges accumulated in the at least two photodiodes are transferred to the floating diffusion area;
   a second transfer controller configured to transfer photocharges accumulated in the second photocharge accumulator to the floating diffusion area; and
   a driving transistor configured to generate a pixel signal according to the photocharges transferred to the floating diffusion area.

2. The pixel circuit of claim 1, wherein if the image sensor captures an image corresponding to one frame, a number of photocharges accumulated in the first photocharge accumulator is greater than a number of photocharges accumulated in the second photocharge accumulator.

3. The pixel circuit of claim 1, wherein the at least two photodiodes comprises first through $m^{th}$ photodiodes, and the at least one photodiode comprises first through $n^{th}$ photodiodes, where m and n are integers and m is greater than n,
   the first transfer controller comprises first through $m^{th}$ transfer transistors corresponding to the first through $m^{th}$ photodiodes, and
   the second transfer controller comprises first through $n^{th}$ transfer transistors corresponding to the first through $n^{th}$ photodiodes.

4. The pixel circuit of claim 1, wherein at least a portion of a time period in which the first photocharge accumulator accumulates the photocharges overlaps a time period in which the second photocharge accumulator accumulates the photocharges.

5. The pixel circuit of claim 1, wherein after a first pixel signal is generated according to the photocharges accumulated in the first photocharge accumulator, a second pixel signal is generated according to the photocharges accumulated in the second photocharge accumulator.

6. The pixel circuit of claim 1, wherein a size of the at least one photodiode of the first photocharge accumulator is the same as a size of the at least one photodiode of the second photocharge accumulator.

7. The pixel circuit of claim 1, wherein a size of the at least one photodiode of the first photocharge accumulator is greater than a size of the at least one photodiode of the second photocharge accumulator.

8. An image sensor comprising:
   a pixel array comprising a plurality of pixels, each of the pixels comprising a plurality of sub-pixels, the plurality of sub-pixels comprising m first sub-pixels and n second sub-pixels, each of the m first sub-pixels comprising a first photodiode, each of the n second sub-pixels comprising a second photodiode, the m first sub-pixels being exposed to light for a longer period of time than the n second sub-pixels, where m and n are integers,
   a read circuit configured to generate pixel data from a pixel signal of the pixel array;
   at least one first transfer controller configured to commonly control a light exposure for the m first sub-pixels; and
   at least one second transfer controller configured to commonly control a light exposure for the n second sub-pixels.

9. The image sensor of claim 8, wherein the first photodiode and the second photodiode have a same size.

10. The image sensor of claim 8, wherein photocharges from the first photodiodes of the m first sub-pixels are summed in a floating diffusion area.

11. The image sensor of claim 8, wherein if the image sensor captures an image corresponding to one frame, each of the pixels outputs a first pixel signal according to the m first sub-pixels and a second pixel signal according to the n second sub-pixels.

12. The image sensor of claim 11, further comprising:
   an image processor configured to process the first and second pixel signals to generate image data.

13. An image sensor, comprising:
   a pixel circuit including a pixel, the pixel including,
      a plurality of first light sensors configured to collect first photocharges, and
      a plurality of second light sensors configured to collect second photocharges; and
   a controller configured to generate a first control signal and a second control signal, the first control signal controlling a first exposure time period during which the first light sensors collect the first photocharges, the second control signal controlling a second exposure time period during which the second light sensors collect the second photocharges, the controller further configured to commonly control a light exposure with respect to the first light sensors for the first exposure time period, and commonly control a light exposure with respect to the second light sensors for the second exposure time period.

14. The image sensor of claim 13, wherein the controller is configured to generate the first and second control signals such that the second exposure time period is less than the first exposure time period.

15. The image sensor of claim 13, wherein a number of light sensors in the plurality of first light sensors is greater than a number of light sensors in the plurality of second light sensors.

16. The image sensor of claim 15, wherein the controller is configured to generate the first and second control signals such that the first exposure time period is the same as the second exposure time period.

17. The image sensor of claim 13, wherein the pixel circuit includes,
   first switch circuitry configured to transfer the first photocharges to a node during a first read time period based on the first control signal, and
   second switch circuitry configured to transfer the second photocharges to the node during a second read time period based on the second control signal.

18. The image sensor of claim 17, wherein the pixel circuit includes,
   reset circuitry configured to reset the node based on a reset signal, and selection circuitry configured to output the transferred first and second photocharges based on a selection signal.

19. The image sensor of claim 18, wherein the controller is configured to,
generate the selection signal such that the selection circuitry outputs the transferred first photocharges during the first read time period and outputs the transferred second photocharges during the second read time period, and
generate the reset signal such that the node is reset during a reset time period between the first read time period and the second read time period.

* * * * *